UNITED STATES PATENT OFFICE.

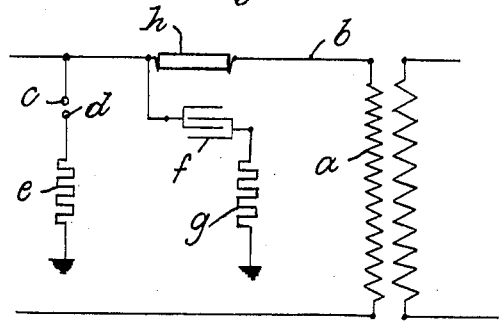
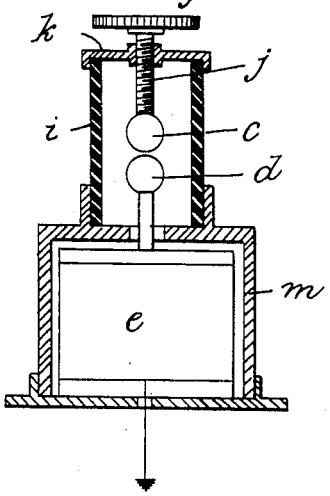
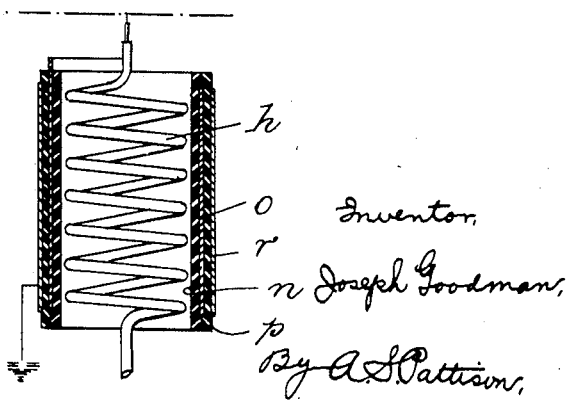

JOSEPH GOODMAN, OF HAYES, ENGLAND.

PROTECTIVE MEANS FOR ELECTRICAL APPARATUS HAVING WINDINGS.

1,406,002.	Specification of Letters Patent.	Patented Feb. 7, 1922.

Application filed November 20, 1917. Serial No. 202,954.

*To all whom it may concern:*

Be it known that I, JOSEPH GOODMAN, a subject of the King of Great Britain and Ireland, residing at Hayes, in the county of Middlesex, England, have invented Improvements in or Relating to Protective Means for Electrical Apparatus Having Windings, of which the following is a specification.

Although in cases where electrical apparatus, particularly apparatus containing electrical windings, is installed in such a position that the end turns of the windings and the terminals are liable to abnormal stresses, due to line disturbances, surges and the like, it is customary to specially isolate or insulate or isolate and insulate such end turns and terminals with a view to preventing damage thereto, we have found that it is nevertheless highly necessary further to safeguard such apparatus by other protective means arranged external thereto.

Such external protective means can be designed with this view wholly in end, whereas when protective means are provided in the apparatus to be protected, proper protection is possibly not able to be arranged for if, at the same time, the design of the apparatus is to be kept properly efficient.

The object of this invention is to provide in a convenient and practical form, protective means for avoiding damage to electrical apparatus having windings, by reason of abnormal stresses, surges and the like, whether of high or low frequency, to which such apparatus may be subjected.

As is well known, means for this purpose may possibly be protective against a normal frequency high voltage surge and yet be inoperative in the case of a high frequency low voltage surge; it is also well known that a high frequency current will pass through a capacity such as a condenser rather than through an inductance such as a choking coil.

Now protective means according to the invention for use in connection with the winding of an electrical apparatus to be protected from abnormal stresses such as those hereinbefore referred to, for instance the primary winding of a transformer, comprises a spark gap device connected to one of the line or supply conductors leading to one end of the winding and having in series therewith a noninductive resistance connected to earth. It also comprises a capacity such as a condenser, connected to the said line or supply conductor and also to earth, it may be through a non-inductive resistance. It also comprises a specially designed choking coil adapted to offer an extremely high resistance to currents of high frequency for which purpose it may for example comprise a coil of wire of a compound character consisting for instance of an inner portion or core of metal of good electrical conductivity, as for example copper, and an outer layer of metal of low electrical conductivity, as for example nickel or iron. The capacity is or may be connected to the line or supply conductor between the connection thereto of the spark gap device and the special choking coil, which is arranged nearer to the winding to be protected than the spark gap device and is in series with the winding.

In such protective means the spark gap device is adapted to operate when line disturbances, surges or like electrical stresses above a predetermined fixed limit, occur. The condenser is adapted to absorb high frequency surges of low voltage and the choking coil to stop high frequency surges of a value less than those at which the spark gap device is operative.

Protective means according to the invention can be variously constructed and, if required, be applied in connection with the line or supply conductor connected to each end of the winding to be protected.

In the accompanying illustrative drawings, Fig. 1 shows diagrammatically a transformer with protective means according to the invention applied to the primary winding thereof. Fig. 2 shows, in central section, a spark gap device, such as referred to and Fig. 3 shows a combined choking coil and condenser such as referred to. Fig. 4 is a view partly in section of a portion of the choking coil.

In Fig. 1, *a* represents the primary winding of a transformer to which the protective means are shown applied. *b* is the line or supply conductor connected to one end of such winding. *c* and *d* are the terminals or knobs of a spark gap device, one of them being connected to the line or conductor *b* and the other to a non-inductive resistance *e* connected to earth. *f* is a condenser connected to the said line or supply conductor *b* and also to earth through a non-inductive resistance *g*. *h* is the special choking coil arranged in series with the line or supply conductor $b$ and the winding $a$. The spark gap device, condenser and choking coil are shown arranged in relation to one another and to the winding $a$ in the manner hereinbefore mentioned.

The spark gap device in the example shown, comprises the two metal knobs $c$ and $d$ enclosed in a glass case $i$ and adjustable the one in relation to the other, as by providing one of them with a screw threaded shank $j$ passing through a screw threaded hole in the cover $k$ of the glass case. The non-inductive resistance $e$ (Fig. 1) through which the knob $d$ is connected to earth is packed or condensed in a box $m$ forming a base or carrier for the glass case $i$.

The choking coil $h$, comprising a coil of compound wire such as hereinbefore described, is, according to the construction shown in Fig. 3 enclosed in a cylinder $n$ of thin glass or other material possessing a high specific inductive capacity. Around this cylinder is placed a metal plate $o$ that is adapted to be connected at one end to the line or supply conductor $b$ of the electrical apparatus to be protected and to serve as one pole or plate of the condenser $f$ (Fig. 1). This metal plate is surrounded by a cylinder $p$ of thin glass or equivalent material which is surrounded by a second metal plate $r$ forming the other pole or plate of the condenser which is connected to earth either directly as shown in Fig. 3, or as shown in Fig. 1, through a suitable non-inductive resistance $g$. In Fig. 4, $s$ represents the inner metal core of a portion of the choking coil $h$ (Fig. 3) and $t$ the outer layer of metal of a lower conductivity.

What I claim is:—

1. In an electric circuit, the combination with a line constituting one side of the circuit, of a spark gap device and a non-inductive resistance connected in series with each other and between said line and earth, an inductance arranged in the line, and a capacity connected between said line and earth.

2. In an electric circuit, the combination with a line constituting one side of the circuit, of a spark gap device and a non-inductive resistance connected in series with each other and between said line and earth, an inductance arranged in the line, and a capacity connected to said line between the point of connection thereto of the spark gap device and said inductance.

3. In electrical apparatus having a winding liable to be subjected to abnormal electrical stresses, the combination with the winding and a supply conductor in circuit herewith, of protective means comprising a spark gap device and a non-inductive resistance connected in series between said supply conductor and earth, a capacity connected between said supply conductor and earth and an inductance adapted to offer an extremely high resistance to currents of high frequency, arranged in circuit with said supply conductor and winding.

4. In electrical apparatus having a winding liable to be subjected to abnormal electrical stresses, the combination with the winding and a supply conductor in circuit therewith, of protective means comprising a spark gap device and a non-inductive resistance connected in series between said supply conductor and earth, a capacity and a non-inductive resistance connected in series with each other between said conductor and earth and an inductance adapted to offer an extremely high resistance to currents of high frequency, arranged in circuit with said supply conductor and winding.

5. In electrical apparatus having a winding liable to be subjected to abnormal electrical stresses, the combination with the winding and a supply conductor connected thereto, of protective means comprising a spark gap device and a non inductive resistance connected in series with each other between said supply conductor and earth, a capacity connected between said supply conductor and earth and an inductance arranged in circuit with said conductor and winding between the points of connection of said capacity to said conductor and said winding.

6. In electrical apparatus having a winding liable to be subjected to abnormal electrical stresses, the combination with the winding and a supply conductor connected thereto, of a choking coil arranged in series with the conductor, a spark gap device and non-inductive resistance connected in series with each other between said conductor and earth and a condenser and non-inductive resistance connected in series with each other between said conductor and earth, the points of connection of said spark gap device and condenser to said conductor being at the outer side of said choking coil.

7. In an electric circuit, the combination with a line constituting one side of a circuit, of protective means therefor comprising an adjustable spark gap device connected to said line, a non-inductive resistance connected to said spark gap device and to earth and a casing enclosing said spark gap device and resistance, a capacity connecting said line to earth and a choking coil in series with said line.

8. In an electric circuit, the combination with a line constituting one side of a circuit liable to be subjected to abnormal electrical stresses, of protective means comprising a capacity connected to said line and earth and an inductance arranged in said line, said capacity comprising inner and outer cylinders of dielectric material and metal sheets one of which is arranged between the cylinders and the other outside the outer cylinder, said capacity being connected on one side to line and on the other side to earth and said inductance comprising a compound coil composed of two lengths of metal in intimate contact with one another along their adjacent surfaces one length being of high electrical conductivity and the other of low conductivity.

9. The combination with the primary winding of a static transformer, and a supply conductor connected to one end thereof, of a spark gap device with non-inductive resistance connecting said conductor to earth, a condenser connecting said conductor to earth, and between the points of connection of said spark gap device and condenser to said conductor and said winding, a choking coil arranged in series with said conductor and winding and adapted to offer an extremely high resistance to currents of high frequency.

In testimony whereof I affix my signature, in presence of two witnesses.

JOSEPH GOODMAN.

Witnesses:
FREDERICK WILLIAM BROUGHAM,
DOROTHY CONSTANCE BENWELL.